United States Patent
Shemer et al.

(10) Patent No.: US 11,917,724 B2
(45) Date of Patent: Feb. 27, 2024

(54) LOCATION BASED APPLICATION MIGRATION FOR ENHANCING LIGHTWEIGHT IOT DEVICE APPLICATIONS

(71) Applicant: EMC IP Holding Company LLC, Hopkinton, MA (US)

(72) Inventors: Jehuda Shemer, Kfar Saba (IL); Kfir Wolfson, Beer Sheva (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/453,647

(22) Filed: Jun. 26, 2019

(65) Prior Publication Data
US 2020/0413481 A1    Dec. 31, 2020

(51) Int. Cl.
*H04W 80/10* (2009.01)
*H04W 4/029* (2018.01)
(Continued)

(52) U.S. Cl.
CPC ........... *H04W 80/10* (2013.01); *B64C 39/024* (2013.01); *H04W 4/027* (2013.01); *H04W 4/029* (2018.02);
(Continued)

(58) Field of Classification Search
CPC .......... H04B 5/0062; G01S 5/02; H04W 4/80; H04W 8/08; H04W 4/50
See application file for complete search history.

(56) References Cited

U.S. PATENT DOCUMENTS

2011/0237185 A1* 9/2011 Murray ................. H04W 4/023
455/41.1
2013/0115915 A1* 5/2013 Tipton ................... H04W 12/06
455/411
(Continued)

FOREIGN PATENT DOCUMENTS

WO    2019/010049 A1    1/2019

OTHER PUBLICATIONS

3GPP TS 23.501, v15.4.0, System Architecture for the 5G System, Dec. 2018 (Year: 2018).*
(Continued)

*Primary Examiner* — Yu-Wen Chang
(74) *Attorney, Agent, or Firm* — Workman Nydegger

(57) ABSTRACT

One example method includes receiving input concerning a mobile IoT device, and the input includes information about a location of the mobile IoT device, information about whether the mobile IoT device is moving, and, when the mobile IoT device is moving, information about the range, speed, and bearing of the mobile IoT device. Next, the method includes generating a predicted location of the mobile IoT device based on the inputs received, using the predicted location of the mobile IoT device and a map of nodes in an environment where the mobile IoT device is located to make a migration decision concerning an application used by the mobile IoT device, and migrating the application from a present location to a node expected to be accessible by the mobile IoT device when the mobile IoT device reaches the predicted location, and the node and present location are physically separated by a distance.

16 Claims, 5 Drawing Sheets

(51) Int. Cl.
    *B64C 39/02*     (2023.01)
    *H04W 4/02*     (2018.01)
    *H04W 64/00*     (2009.01)

(52) U.S. Cl.
    CPC ....... *H04W 64/006* (2013.01); *B64U 2201/10* (2023.01)

(56) References Cited

U.S. PATENT DOCUMENTS

| | | | | |
|---|---|---|---|---|
| 2015/0094054 | A1* | 4/2015 | Osman | H04M 1/72516 455/421 |
| 2015/0199208 | A1* | 7/2015 | Huang | G06F 9/44505 718/1 |
| 2015/0200867 | A1* | 7/2015 | Dutta | H04L 49/3045 709/226 |
| 2017/0060611 | A1* | 3/2017 | Birkestrand | G06F 9/5033 |
| 2017/0060900 | A1* | 3/2017 | Marinov | G06F 11/14 |
| 2017/0075716 | A1* | 3/2017 | Bennett | G06F 9/45558 |
| 2017/0245180 | A1* | 8/2017 | Lim | H04W 36/0072 |
| 2018/0077024 | A1* | 3/2018 | Zhang | H04L 63/0272 |
| 2018/0176510 | A1* | 6/2018 | Pepperell | H04N 7/152 |
| 2019/0058242 | A1* | 2/2019 | Tabe | H01Q 1/248 |
| 2019/0104030 | A1* | 4/2019 | Giust | H04L 41/0681 |
| 2019/0104182 | A1* | 4/2019 | Elzur | H04L 67/125 |
| 2019/0129745 | A1* | 5/2019 | Wang | G06F 9/45558 |
| 2019/0141610 | A1* | 5/2019 | Sabella | G06F 8/70 |
| 2019/0158606 | A1* | 5/2019 | Guim Bernat | H04W 4/40 |
| 2019/0373472 | A1* | 12/2019 | Smith | H04W 4/38 |
| 2020/0169856 | A1* | 5/2020 | Yang | H04L 43/16 |
| 2020/0196203 | A1* | 6/2020 | Yang | H04W 36/14 |
| 2020/0229038 | A1* | 7/2020 | Zhu | G06F 9/546 |
| 2020/0242934 | A1* | 7/2020 | Xu | G08G 1/144 |
| 2020/0379908 | A1* | 12/2020 | Curewitz | G06F 12/1009 |
| 2020/0379914 | A1* | 12/2020 | Yudanov | G06F 12/1027 |
| 2020/0409761 | A1* | 12/2020 | Stuntebeck | G06F 9/5027 |

OTHER PUBLICATIONS

Application and Network VNF migration in a MEC-enabled 5G Architecture, Sarrigiannis et al., IEEE Xplore (Year: 2018).*

Ashkan et al., "All one needs to know about fog computing and related edge computing paradigms: a complete survey", Journal of Systems Architecture, Elsevier BV, vol. 98, Feb. 12, 2019, pp. 289-330.

International Search Report and Written Opinion received for PCT Patent Application No. PCT/US20/024142, dated Jul. 15, 2020, 15 pages.

Memon et al., "Using Machine Learning for Handover Optimization inVehicular Fog Computing", Arxiv.Org, Cornell University Library, 201 Olin Library Cornell University Ithaca, Ny 14853, Dec. 18, 2018, XP080995588.

Paolo et al., "A migration-enhanced edge computing support for mobile devices in hostile environments", 2017 13th International Wireless Communications and Mobile Computing Conference (IWCMC), IEEE, Jun. 26, 2017, pp. 957-962.

Binz, Tobias et al., "Institute of Architecture of Application Systems, CMotion: A Framework for Migration of Applications into and between Clouds", Institute of Architecture of Application Systems, University of Stuttgart, Germany, 2011 IEEE International Conference on Service-Oriented Computing and Applicaitons (SOCA), Dec. 2011.

* cited by examiner

LOCATION BASED APPLICATION MIGRATION FOR ENHANCING LIGHTWEIGHT IOT DEVICE APPLICATIONS

FIELD OF THE INVENTION

Embodiments of the present invention generally relate to applications for use by lightweight 'Internet of Things' (IoT) devices. More particularly, at least some embodiments of the invention relate to systems, hardware, software, computer-readable media, and methods for enabling use of resource-intensive applications by mobile IOT devices.

BACKGROUND

Modern IoT networks are expected to include moving devices which require large amounts of data and data processing with low latency. Auto-piloted drones, for example, may require complicated computations for image processing applications. Typically however, such applications require more power and CPU resources than are locally available on the drone. Moreover, the necessary computations cannot always be performed in the cloud or a company headquarters, as in some applications at least, the latency of the connection between the drone and the site where the computations are performed may be too large. This includes applications like live-navigation and live-targeting. In order to run these, and other, applications on these lightweight machines, more computational power, and a low latency connection, are needed.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
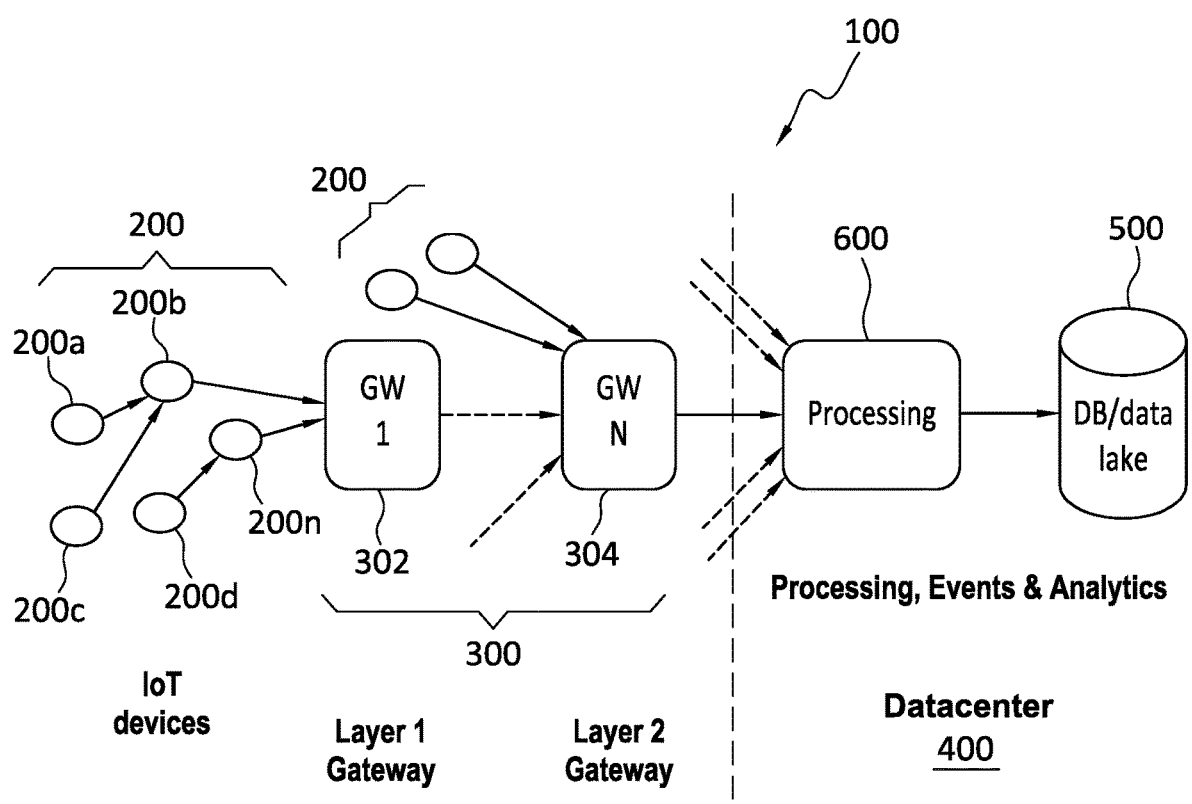
FIG. 1 discloses aspects of an example architecture and IoT environment for some embodiments of the invention.

Embodiments of the present invention generally relate to applications for use by lightweight IOT devices. More particularly, at least some embodiments of the invention relate to systems, hardware, software, computer-readable media, and methods for enabling use of resource-intensive applications by mobile IOT devices. As used, herein, a 'lightweight' IoT device embraces, among other things, an IoT device that lacks adequate processing power for one or more applications and/or is unable to communicate with a remote site at an acceptable latency. An IoT device is any device, mobile or otherwise, that is able to communicate with one or more other devices by way of a computer network, one example of which is the internet. In at least some embodiments of the invention, such communication generally takes place by way of wireless communication systems and devices, examples of which are disclosed herein.

In general, the present disclosure opens up a path for a new type of applications for fast-moving, lightweight, IoT devices such as flying drones. By automatically utilizing compute and memory resources with very low latency, new apps can be written to perform operations such as image-processing-based live-navigation, live-targeting, live-image and face recognition, profiling, and more with immediate response, which such lightweight drones and other IoT devices cannot do today.

Example embodiments of the invention may be employed in connection with IoT networks and mini data centers. Such mini data centers can be installed, for example, in busy places such as street corners and skyscrapers, and/or other locations. Embodiments of the invention leverage such data centers for implementing dedicated migrating applications that automatically follow the IoT devices as they move through the environment and deliver computation services as close as possible to the moving client IoT device. Embodiments of the invention also operate in connection with mobile IoT devices before they move or change location.

Thus, for example, embodiments of the invention take into account the location of the device, its planned travel trajectory and more, and calculate where to live-migrate the application to. Embodiments of the invention may, but are not required to, employ various approaches and solutions to pre-position resources, code, and data, for use by a mobile IoT device. Examples of such approaches and solutions include, but are not limited to, replication solutions such as CMotion for replicating containers and/or Dell EMC RecoverPoint for VMs for replicating VMs, to automatically pre-allocate computing resources, such as processing resources, and storage resources, and pre-fetch code and data. An application such as vMotion can be used to move the IoT device application for the client to use as soon as the client moves to a new location. In this way, the client can provide data to the application for processing by the application. The foregoing are provided only by way of example, and are not required to be used by any embodiment.

In this way, embodiments of the invention may be effective in dealing with the inherent limitations of drones, and other small mobile IoT devices, which are typically unable to perform intense and complicated computations at least because they are unable to lift and carry the relatively large power sources and storage/memory/CPU elements that would be required to perform such processing. At least some embodiments of the invention are also able to provide for relatively low latency computations and communications that may be required, for example, in signal and image processing operations, some of which are latency sensitive, needed to be performed with respect to data gathered and/or generated by the mobile IoT device. Moreover, drones and other mobile/moving IoT devices have location and trajectory information available which can be used to help ensure delivery of the necessary resources to the right place at the right time.

Advantageously then, even though the IoT device may stop, move, and change locations, in an environment, sometimes unpredictably, the IoT device may nonetheless be able to access pre-positioned processing power assets and associated functionality, applications, data, and code, collectively 'resources,' that are in relatively close proximity to its location, wherever that may be. Moreover, because the IoT device is in close proximity to the resources, latency is reduced in communications between the IoT device and those resources. Thus, the lightweight IoT device is able to access the resources necessary to support its resource-intensive operations, while doing so over a low latency connection, notwithstanding that the IoT device lacks, and is unable to transport, adequate onboard resources of its own to support those operations.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Architecture and IoT Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data generation, data processing, and data management, operations. Such data management operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, such as by a mobile IoT device for example, can be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read and write operations initiated by one or more clients, examples of which include one or more mobile IoT devices.

In addition to the storage environment, the operating environment may also include one or more clients, such as mobile IoT devices for example, that are capable of collecting, modify, and creating, data. As such, a particular client may employ, or otherwise be associated with, one or more instances of each of one or more applications that perform such operations with respect to data. Some examples of applications that can reside, and operate, at a mobile IoT device are disclosed elsewhere herein.

Devices in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 1, one example of an architecture for embodiments of the invention is denoted generally at 100. In general, the architecture 100 may include one or more IoT devices 200, which may be implemented and operate as IoT edge devices, although that is not required. Example IoT devices may include sensors, actuators, applications, or any other systems, apparatus, or devices, operable to collect, generate, process, and transmit, information relating to the environment that the IoT devices 200 are in. Any number 'n' of IoT devices 200a, 200b, 200c, 200d . . . 200n can be employed. The IoT devices may be referred to herein more generally as clients.

As noted herein, IoT devices 200 that can be employed in connection with embodiments of the invention include mobile IoT devices. Mobile IoT devices include IoT devices that can move under their own power or, for example, a cell phone or other device that can be connected to a vehicle or device capable of movement. Some example mobile IoT devices that may be employed in connection with embodiments of the invention include, but are not limited to, remotely controlled vehicles, and autonomous vehicles. Either, or both, of these types of vehicles can operate in various environments including water, air, and/or land. Mobile IoT devices include vehicles such as cars, as well as devices such as drones, sometimes referred to as unmanned aerial vehicles (UAV). A mobile IoT device may carry human or other live occupants, or may be unmanned. Further, a mobile IoT device can be an aircraft, a watercraft, a vehicle configured to travel on land, or a vehicle with any combination of these capabilities.

In some embodiments, two or more of the mobile IoT devices may be configured to communicate with each other, either directly, or by way of an intervening device or systems such as a mini datacenter or other node. Such a mini datacenter may be referred to herein more generally as a node. In some embodiments, the mini datacenters can belong to one or more service providers, and the replication systems disclosed herein may employ multi-tenancy support in order to segregate data as between different clients and different vendors who use the same mini datacenter(s).

With continued reference to the example architecture 100 disclosed in FIG. 1, the IoT devices 200 may operate in connection with one or more gateways 300, such as GW-1 302 and GW-n 304 for example. In general, the gateways 300 serve to consolidate communication and management of multiple IoT devices 200. The gateways 300 are not required but can be useful in circumstances where IoT device 200 networking capabilities are local in nature with respect, for example, to power and/or connectivity, and the gateway 300 is used by one or more of the IoT devices 200 to connect to a network such as the internet for example. In some embodiments, a general IoT system consolidates IoT devices to gateways and then to a central backend datacenter where processing of data gathered by the IoT devices can be performed. As shown in FIG. 1, there can be several layers of gateways 300.

As shown, a gateway may be dedicated to a particular array or group of IoT devices 200, although that is not required. In the illustrated example, the IoT devices 200a . . . 200n communicate by way of gateway 302. Any of the connections between the elements shown in FIG. 1 may be wireless, or hardwired, connections.

It is noted here that the scope of the invention is not limited to any particular wireless communication system, device, or communication protocol. Some example wireless communication systems and devices may include, for example, cell networks such as 3G, 4G, and 5G networks for example, satellites, and/or other systems and devices to facilitate communication. Other examples of wireless communication systems include radio frequency (RF) systems, near-field communication systems, ultra high frequency (UHF), and very high frequency (VHF), communication systems. Communications between and among the elements disclosed herein, including, but not limited to, the IoT devices, the elements that remotely control IoT devices, and nodes such as mini datacenters, may be encrypted.

As also indicated, gateways such as gateway 302 and gateway 304 may be referred to as corresponding to respective layers, such as Layer 1 and Layer 'n,' for example. The layers may be layers in a communication configuration. Moreover, the gateway in the highest layer in a communication configuration, such as the gateway 304, may communicate with one or more other gateways at lower layers, such as the gateway 302. As well, the gateways may be arranged in series with each other, although that is not necessarily required and a parallel gateway arrangement could also be used. In the example illustrated configuration, the layer 'n' gateway 304 consolidates all communications from the lower layers, such as layer 1.

As further indicated in FIG. 1, data storage functionalities associated with the architecture 100 may be implemented by a datacenter 400. The datacenter 400 may include storage 500 that may comprise a database (DB) and/or data lake configuration, either or both of which may also be elements of a datacenter. More generally however, the storage 500 embraces any system and/or components operable to store data and respond to read and write requests. In more detail, the storage 500 may be used to save incoming data from the IoT devices 200 after that data has been processed by a processing server 600 which is able to communicate with the storage 500.

In general, the processing server 600 and/or other components may be programmed to receive data from one or more of the IoT devices 200, such as by way of one or more gateways 300, and perform processing and/or analytics with respect to that sensor data. That is, the raw data provided by the IoT devices 200 can be received and processed by the processing server 600. The processing server 600 may, but need not, be an element of the datacenter 400. Further details concerning operations performed by the processing server 600 are disclosed elsewhere herein.

B. Example Host and Server Configurations

Figure 2:
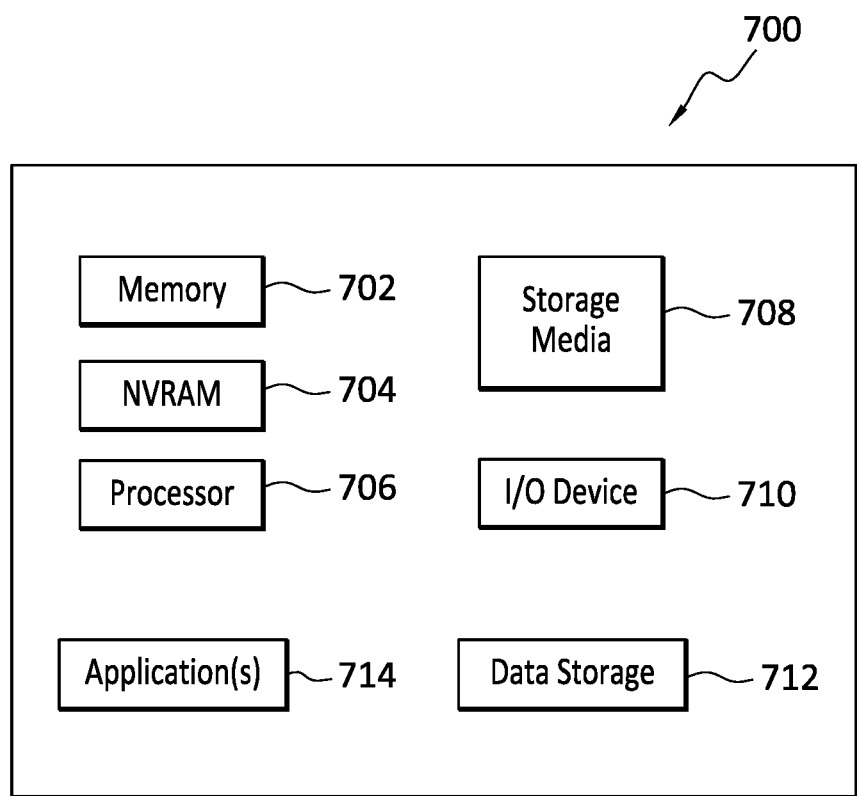
FIG. 2 discloses aspects of an example host configuration.

With reference briefly now to FIG. 2, any one or more of the IoT devices 200, gateways 300, datacenter 400, storage 500, processing server 600 and its components, and automigration system 1000, can take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 2.

In the example of FIG. 2, the physical computing device 700 includes a memory 702 which can include one, some, or all, of random access memory (RAM), non-volatile random access memory (NVRAM) 704, read-only memory (ROM), and persistent memory, one or more hardware processors 706, non-transitory storage media 708, UI device 710, and data storage 712. One or more of the memory components 702 of the physical computing device 700 can take the form of solid state device (SSD) storage. As well, one or more applications 714 are provided that comprise executable instructions.

Such executable instructions can take various forms including, for example, instructions executable to perform any method or portion thereof disclosed herein, and/or executable by/at any of a storage site, whether on-premises at an enterprise, or a cloud storage site, client, datacenter, backup server, blockchain network, or blockchain network node, to perform any of the functions disclosed herein. As well, such instructions may be executable to perform any of the other operations disclosed herein including, but not limited to, data collection, data processing including data analysis, data read/write/delete operations, instantiation of one or more applications, IoT device location determination and prediction, migration of applications and/or other resources from one location to another, and operation of the applications located at one or more nodes.

Further still, yet other executable instructions can be executed to perform various operations involving one or more IoT devices and any of a mini-datacenter, regional datacenter, cloud backend, or other data collection and processing entity. These operations include, but are not limited to, tracking, targeting including live-targeting, image capture (still and video), electronic surveillance, signal collection and analysis, listening, navigation, image recognition including facial recognition, profiling, and, processing and transmission of collected data including image processing, and collection of data using one or more sensors of various types where such data may be any data relating to a characteristic of a physical environment.

C. Example Operating Environment

Figure 3:
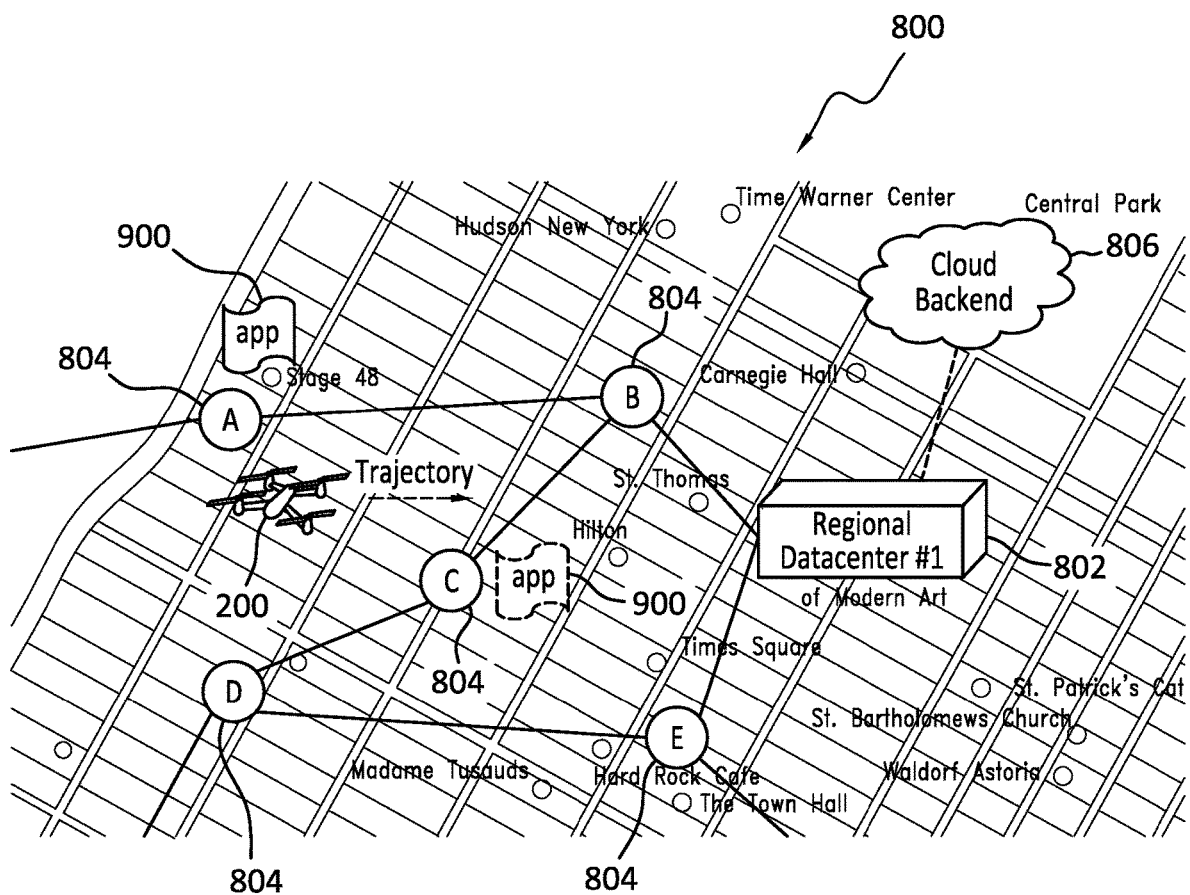
FIG. 3 discloses aspects of an example operating environment for some embodiments of the invention.

With attention now to FIG. 3, details are provided concerning operating environments for embodiments of the invention, where one example operating environment is denoted generally at 800. In the illustrated example, one or more regional datacenters 802 and mini datacenters 804 A-E are spread across a city district. The mini datacenters 804 may, but need not, be interconnected with each other with some redundancy, and the mini datacenters 804 also have connectivity to the regional datacenter 802, which may operate as a gateway to a cloud backend 806. Data processing and analysis, as disclosed herein, can be performed at any one or more of the mini datacenters 804, regional datacenter 802, and/or cloud backend 806. In some embodiments, the cloud backend 806 takes the form of, or includes, a cloud datacenter. Depending upon the implementation, the regional datacenter 802 may be omitted and the mini datacenters 804 can be connected directly to the cloud backend 806, which does not have to be in the cloud at all (public nor private).

The mini datacenters 804 can take a variety of different forms. For example, one or more of the mini datacenters 804 may be implemented as hyper converged software defined data centers, based on products such as Dell-EMC VxRail, or Neutanix for example. The mini datacenters 804 can be mobile and/or stationary. In some embodiments, the mini datacenters 804 are connected to the IoT framework. The mini datacenters 804 can be located, for example, inside a traffic light, a street sign, on a rooftop, or any other suitable location(s). Being immobile allows the mini datacenters 804 to hold larger storage and have greater power consumption and processing power than mobile units inside devices such as mobile IoT devices 200. Thus, the mini datacenters 804 can perform resource-intensive computation and processing that is beyond the capability of small and mobile IoT devices 200 due to constraints on the storage, power consumption, and processing power, of the mobile IoT devices 200.

In some instances, an application at a mini datacenter 804 or other node can begin processing data inline as the data is received from an IoT device 200. An application at a mini datacenter 804 or other node can additionally or alternatively wait to perform any processing until an entire dataset is received from the IoT device 200. Processing of the data by the application can be triggered by the IoT device 200, by a third party entity, and/or can be performed automatically.

It should be noted that the arrangement in FIG. 3 is provided only by way of example. Thus, the size, number, location, geographical spacing, interconnectivity, latency, and/or other parameters relating to the mini datacenters 804 can be selected as needed. Moreover, while the example of FIG. 3 involves a metropolitan area, latency may become increasingly problematic in larger areas. Thus, the number and location of the mini datacenters 804 in a given environment or space may be such as to help ensure that the latency in communications between the IoT device 200 and any given mini datacenter remains at an acceptable level. It is noted that the IoT device 200 can both communicate data to, and receive data from, one or more of the mini datacenters 804 and/or other nodes.

In environments such as urban environments, the density of mini datacenters 804 (mini datacenters 804 per unit area) may be sufficiently high that the IoT device 200 is always, or nearly so, close enough to at least one mini datacenter 804 that latency problems are largely, if not completely, avoided. In other environments however, such as a desert or wilderness environment for example, the density of mini datacenters 804 may be relatively low and the IoT device 200 can experience relatively long periods of unacceptably high latency. In these environments, the IoT device 200 may or may not communicate, or attempt to communicate, with a mini datacenter 804 during these periods when high latency is expected or experienced.

In some environments, such as the urban environment example herein, the IoT device may remain in constant communication with a mini datacenter, although the latency associated with the IoT device connection may vary as the IoT moves in its environment. In other environments however, such as the wilderness example herein, the IoT device may break off communication completely as it moves between mini datacenters that may widely geographically dispersed. In this latter case, the IoT device may still be able to transmit its range, bearing, and speed, such as by way of a satellite for example, so that a prediction can be made as to when it will come into range of another mini datacenter with which it can communicate with acceptable latency.

With continued reference to FIG. 3, one or more IoT devices 200, such as a drone for example, moving through the operating environment 800 has one or more accompanying apps, such as app 900, running in the nearest mini datacenter 804 (A). As the IoT device 200 moves in the operating environment 800, the app 900 will be automatically migrated to the nearest mini datacenter 804 (C). As discussed in more detail elsewhere herein, the app 900 may be migrated based on the predicted movement and path of the IoT device which, in turn, can be generated based on various inputs and information including, for example, the latency experienced at mini datacenter 804 (A) and the latency expected to be experienced at mini datacenter 804 (C). Migration of the app 900 can be performed, for example, in anticipation of a change in position of the IoT device 200 or may be performed in real time while the IoT device 200 is moving closer to another mini datacenter 804.

Where multiple apps 900 are associated with an IoT device 200, it may not be the case that all the apps 900 will be migrated. Rather, only the apps 900 expected to be needed by the IoT device at the next expected destination will be migrated to the mini datacenter 804 that is closest to that destination. Thus, of a group of apps 900 associated with a given IoT device 200 or group of IoT devices 200, the different apps 900 can be migrated at different respective times and/or to different respective locations based on the expected needs of the IoT device(s) 200. One or more apps 900 may not be migrated at all, depending upon the circumstances. As well, the order of migration of apps 900 and/or whether or not an app 900 will be migrated at all can be determined based on a prioritization scheme which can, for example, specify that one app 900 is relatively higher prior for migration than another app 900.

D. Auto-Migration of Resources Including Apps

Figure 4:
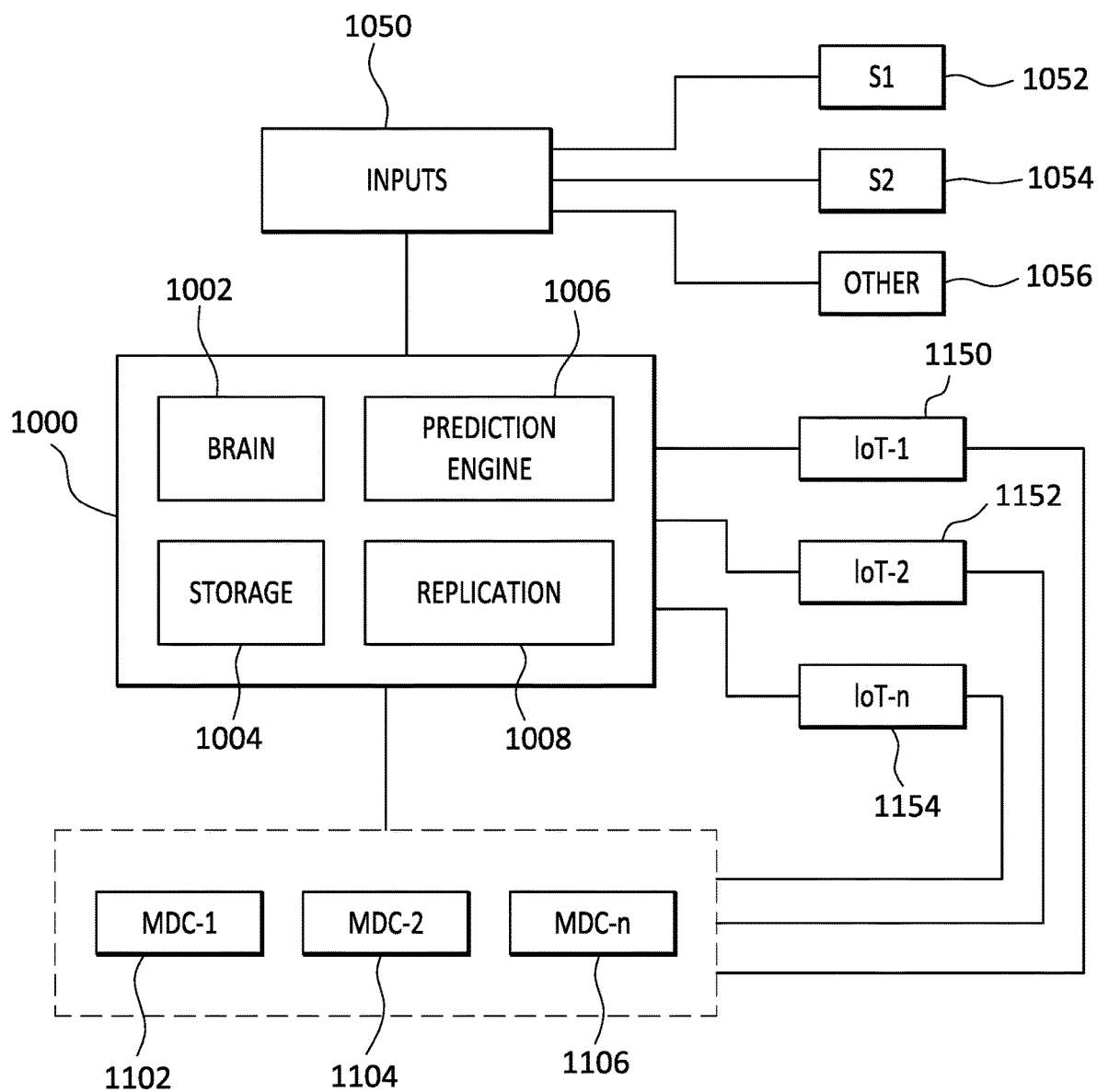
FIG. 4 discloses aspects of an example auto-migration system configuration.

With reference now to FIG. 4, and with continued reference to FIGS. 1 and 3, details are provided concerning various aspects of an auto-migration system (AMS) 1000 that migrates one or more apps and/or other resources based on various inputs. As in the case of the elements disclosed in FIG. 3, the elements disclosed in FIG. 4 may communicate with each other by way of wireless and/or hardwired connections, including by way of one or more computer networks.

As discussed in more detail below, the auto-migration system 1000 includes a brain 1002, storage 1004, a prediction engine 1006, and replication system 1008. The auto-migration system 1000 can reside, or be hosted, at any suitable location(s) including, but not limited to, a mini datacenter, a regional datacenter, a cloud backend, a processing server of a datacenter, or elsewhere. In general, the AMS 1000 is configured to receive inputs that are then used by the prediction engine 1006 to determine an expected location of an IoT device. The inputs module 1050 can receive inputs from sensors 1052 and 1054 and/or other sources 1056. While not specifically indicated in FIG. 4, the inputs received by the inputs module 1050 can include information received directly from one or more on-board sensors of any of the IoT devices 1150, 1152 and 1154. In some embodiments, the IoT devices 1150, 1152 and 1154 can communicate their sensor data directly to the AMS 1000, rather than by way of inputs module 1050.

As well, the AMS 1000 communicates with one or more mini datacenters 1102, 1104 and 1106, which may or may not communicate with each other, and the AMS 1000 may also communicate directly with one or more IoT devices, such as the IoT devices 1150, 1152, and 1154, to transmit data to, and/or receive data from, those IoT devices. Finally, the IoT devices 1150, 1152, and 1154 each communicate, such as by way of a telemetry process for example, with one, some, or all, of the mini datacenters 1102, 1104 and 1106.

With continued reference to the Figures, further details are provided concerning operational aspects of some example embodiments of the invention. In general, and as already noted, auto-migration of resources can be performed by an AMS 1000 that includes a brain 1002, and replication system 1008 that serves to auto-migrate resources based on information, such as IoT position predictions, generated by the brain 1002 in cooperation with the prediction engine 1006. The replication system 1008 can take any suitable form, one example of which is a Cloud Motion Framework (CMotion) which can be based on Dell-EMC RecoverPoint for VMs, or similar technology.

In general, the brain 1002 operates to follow the IoT devices using the prediction engine 1006, which tries to predict where the IoT device is going next. Sometimes, determination of the destination of an IoT device will be relatively straightforward, for example in case of a preconfigured flight plan of a drone. In other cases, determination of the destination of an IoT device will be more complicated, as will be appreciated from the following discussion concerning some example inputs to the prediction engine 1006.

More particularly, inputs employed by the prediction engine 1006 can be of various types and can come from any of a variety of sources, including the IoT devices and their associated sensors and equipment, sensors in the IoT operating environment, third party information and applications, social media, and the results of prior resource migration operations. Some particular examples of the prediction engine 1006 inputs received from the inputs module 1050 and/or from elsewhere include, but are not limited to: IoT device location (can be derived from GPS); IoT device current direction and orientation (from GPS and gyro); IoT current speed (from GPS and accelerometer); planned trajectory or travel path (from flight plan, cell-phone/car navigation app, for example); traffic information (from a cloud map service for example); weather information (from a cloud weather service for example); calendar information (for example, a car passenger has a meeting at a specific time and location); date/time and usage history (retain history for specific client or client type and use that to predict where he/she is heading); social media and chats information (learn from events in the area, previous correspondence with contacts, for example); the app(s) accompanying an IoT device may also have information related to movement of the IoT device, such as a live-navigating app for a flying drone; and, feedback loop from previous attempts learn from mistakes of prediction, and try to correct according to actual route taken.

The prediction engine 1006 can use any combination of the foregoing and/or other inputs relating to an IoT device and/or its environment as a basis for generating a prediction as to (i) the next one or more locations of the IoT device, or devices, (ii) when the IoT device will arrive at that location, and (iii) how long the IoT device may remain at that location. In some embodiments at least, the prediction engine 1006 employs machine learning techniques and prediction methods to process the various inputs and generate a location prediction. An example algorithm that may be employed by the prediction engine 1006 is discussed below in connection with FIG. 5.

With continued reference to the Figures, and FIG. 4 in particular, the brain 1002 knows the map, that is, the number and locations, of the mini datacenters and can feed that information to the prediction engine 1006. The output of the prediction engine 1006, based on the inputs and the mini datacenter map, may be a set of next locations or mini datacenters to which the client is expected to move, and the expected time of the move, with a set of confidence scores. The brain 1002 takes this information into account and can also factor in the estimated time it takes to migrate the accompanying application of the IoT, and/or to migrate other resources that may be needed by that IoT. This input can be learned from history, and can take mini datacenter hardware, networking equipment, current load on resources, current free bandwidth, and other considerations into account.

With this information, the brain 1002 then decides if, and where, to migrate the application and/or other resources to, and can then initiate the migration process. In some instances, the IoT device can be notified by the AMS 1000 that resource migration is in process, and also notified as to what resources are expected to be available at the next location of that IoT device, and when the resources are expected to be available. Additionally, or alternatively, the IoT device can verify what resources are available when it contacts the next mini datacenter or other node. It should be noted, that if no good prediction as to the next location of the IoT was determined by the prediction engine 1006, the brain 1002 can decide not to pre-migrate the app until the IoT is closer to another mini datacenter. In this circumstance, the IoT might suffer from non-optimal latency, but will still remain connected. Further, the brain 1002 can also decide to replicate resources such as the application to several candidate mini datacenters in parallel, and then perform the actual migration at a later stage when there is an acceptable level of certainty as to the mini-datacenter that the IoT device will be nearest to next.

When the brain 1002 has determined that resources such as one or more apps should be migrated from one node to another, such as from one mini datacenter to another mini datacenter, the brain will use one or more replication systems 1008, such as RP4VMs or CMotion to effect the migration. Embodiments of the replication system 1008 have a variety of useful functionalities. For example, the replication system 1008 continuously replicates an application (code and data) and/or other resources to one or more remote locations in parallel, or in chronological series. As well, the replication system 1008 can be used to migrate an application and/or other resources to one or more remote locations, or nodes, without losing information, and with little-to-no downtime, for example, using a feature such as planned failover. As a final example, the replication system 1008 is, in some embodiments at least, implemented as a software-only solution which is easily installed and removed by automation (scripts and APIs). This configuration enables the replication system 1008 to be installed on demand, and where needed.

After the brain 1002 is configured to handle auto-migration, for example, for a specific app and IoT device, the brain 1002 will consult the prediction engine 1006 and will configure the replication system 1008 to protect the application in the current mini datacenter, and to start replicating that application to one or more of the candidate mini datacenters. At the time the brain 1002 finds most appropriate, it will failover, that is, hand-off or migrate, the application to the chosen mini datacenter, and then remove the application copies from the original mini datacenter and the other copies. In some instances, migration can involve replicating an application to another location, or simply removing the application from one location and transmitting that application to another location.

In some instances, the application copies can be retained at the chosen mini datacenter and when the application is needed at the next mini datacenter, only changes in the application are replicated from the chosen mini datacenter to the next mini datacenter, that is, the entire application need not be replicated from the chosen mini datacenter to the next datacenter. In this way, replication time can be reduced. This functionality may be useful in an environment where the IoT device is moving relatively quickly and/or unpredictably.

It is noted that operation of the application is not limited to local data, and the application can utilize data from the backend/cloud in order to perform its operation. As well, an application can comprise, or consist of, a virtual machine (VM), a container, or other element. In at least some embodiments, no particular hardware or software is required to implement the resource migration function. Rather, in such embodiments, resource migration can be affected using application program interfaces (APIs).

E. Example Methods

Figure 5:
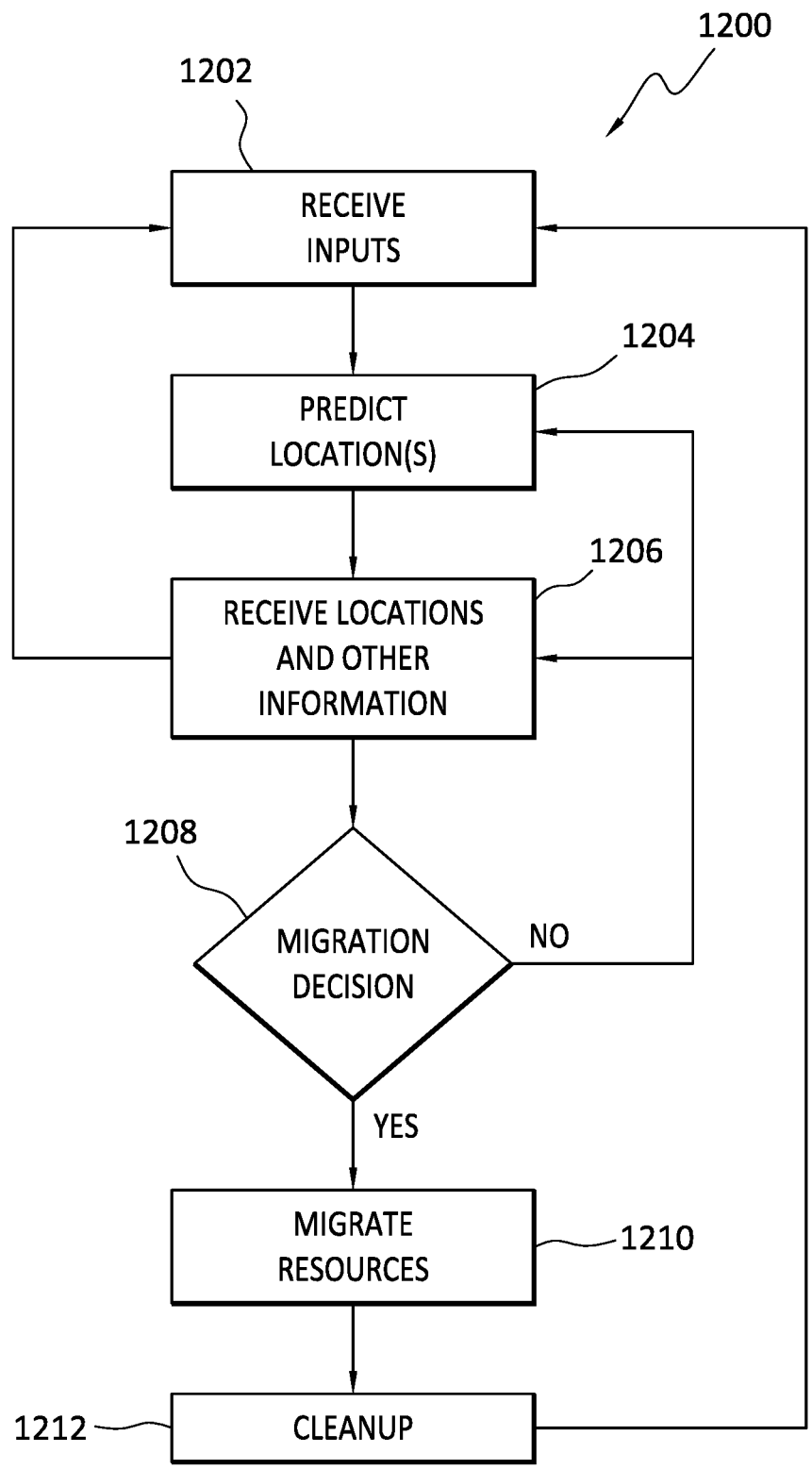
FIG. 5 discloses aspects of an example method.

Directing attention now to FIG. 5, aspects of methods for migrating applications are disclosed, where one particular example method is denoted generally at 1200. Any part(s), or all, of the method of FIG. 5 can be performed automatically without human action or intervention. As well, the method of FIG. 5 can be performed iteratively as one or more IoT devices change locations, or are expected to change locations, in an environment. In another approach, the method of FIG. 5 can be performed iteratively regardless of whether IoT device locations changes are anticipated or not. Further, part or all of the method of FIG. 5 can be performed automatically in response to the occurrence, or non-occurrence, of one or more events. For example, IoT device location prediction can be performed in response to movement of the IoT device, although this relationship is not required to be implemented.

The method 1200 can begin at 1202 when a prediction engine receives various inputs that can be used as a basis for predicting a future location of an IoT device. As disclosed herein, such inputs may include, for example, the current location of the IoT device, and the speed, range, and bearing of the IoT device. These inputs can be received from sensors in the operating environment, on-board sensors of the IoT device, and any other source(s). The prediction engine may also receive as an input, location information concerning one or more mini datacenters in the operating environment of the IoT device. This mini datacenter location information can be in the form of a map, and may be received 1202 by the prediction engine from a brain. As also indicated in FIG. 5, one of the inputs received 1202 by the prediction engine may be location information previously determined by the prediction engine for the IoT device. Thus, the prediction engine can operate in a feedback loop. The prediction engine can also receive as inputs, from the brain, information such as mini datacenter locations.

After receipt of the various inputs 1202, the prediction engine can then use that information as a basis to predict a location 1204 of the IoT device. To illustrate with an example, if the prediction engine knows the speed, range, and bearing, of an IoT device, the prediction engine can make an estimate as to the location of the IoT device at a given point in time, as well as predict when the IoT device will arrive at a particular locations, such as the location of a mini datacenter for example. In some instances, the inputs to the prediction engine may be such that, at a given point of time, it is possible that the IoT device is moving toward, or may move toward, multiple possible different destinations, such as when the IoT device is positioned about equidistant from two different mini datacenters. Thus, the prediction engine may generate a set of multiple locations as an output.

The location information generated by the prediction engine can then be received as inputs 1206 by the brain. Other inputs or information that may be considered by the brain includes information such as how much time is needed to migrate an application to a particular location, as well as the resources available at that destination. As shown in FIG. 5, the information received by the brain can also be returned to the prediction engine and used as a basis for future predictions of IoT locations.

Once the location and other information has been received 1204 by the brain, the brain can then analyze the received information and take a decision 1208 as to whether, when, and where, to migrate an application or other resource. Migration of the application can include instantiating an instance of the application at a new location, or copying the application from one location, such as a mini datacenter for example, to the new location. In some cases, the brain may decide not to migrate the application for a period of time. This decision may be based, for example, on a determination by the brain that the latency associated with the possible future locations is excessive. As another example, the brain may determine that the location prediction provided by the prediction engine is equivocal, or not reliable for some reason. Accordingly, in such circumstances, the brain may delay the migration process until information is received 1206 that the brain decides supports a decision to migrate the application.

In still other cases, the brain may decide not to migrate the application at all such as when, for example, a drone crashes before reaching its destination. In this example case, there is likely no need to migrate the application since the drone is out of commission. The decision not to migrate the application, whether delayed or simply canceled, can be conveyed back to the prediction engine for use in future prediction processes and/or can be retained by the brain as part of information received 1206 by the brain for use in making a migration decision 1208.

As another example, the brain can decide 1208 to migrate the application and/or other resources to multiple different locations when resources permit, but can also delay instantiation of the application instances until the mobile IoT device has moved within an acceptable range of one of the multiple locations. As noted herein, what constitutes an acceptable range may be determined based, for example, on the expected latency between the mobile IoT device and the resources at that location. At such time as the mobile IoT device has moved within range of a location, the resources that have been prepositioned at that application can be instantiated and/or otherwise made available for the use of the mobile IoT device.

When, and if, the brain has decided 1208 to migrate the application, the brain can then decide where to migrate the application, and when to begin the migration process. At the determined time, the brain then migrates 1210 the application(s) and/or other resources to the new location(s). After the migration is completed 1210, the brain can then perform a cleanup 1212 at the prior location, such as by deleting any copies or data relating to the migrated application. The process 1200 can then return to 1202 and begin again.

In some cases, the cleanup 1212 can be omitted. For example, it may be useful not to cleanup 1212 and, instead, later use an older version of the application that was previously migrated to another location 'X' for example, when the mobile IoT device goes near that location. In this case, only the differences between the current application state and the existing application on location 'X' would be migrated. That is, less than the entire application would be migrated and there would be no need to migrate the entire application from scratch.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving input concerning a mobile IoT device, and the input comprises: information about a location of the mobile IoT device; information about a direction and orientation of the mobile IoT device; resources available at a set of nodes; time required to migrate an application; information about whether the mobile IoT device is moving; and, when the mobile IoT device is moving, information about the range, speed, planned trajectory, and bearing of the mobile IoT device;

generating a predicted location at a given point in time of the mobile IoT device based on the input received;

using the predicted location at the given point in time of the mobile IoT device, a map of nodes in an environment containing the set of nodes where the mobile IoT device is located, and the input to make a decision as to whether to migrate part or all of the application, used by the mobile IoT device, from a first node at which the application is executable to a second node expected to be accessible by the mobile IoT device when the mobile IoT device reaches the predicted location;

migrating a portion of the application from the first node to the second node, wherein the portion of the application includes differences between a current application state and an instance of the application existing at the second node and the second node and the first node are physically separated by a distance;

in response to obtaining information indicating the predicted location, automatically pre-positioning a resource at the second node, and the resource comprises a resource that is needed to support operation of the application, and wherein pre-positioning the resource comprises replicating a virtual machine, and/or a replicating a container, at the second node; and notifying the mobile IoT device that the resource is in process of being migrated, is expected to be available for use by the mobile IoT device at the second node, and when the resource is expected to be available based on an estimated time required to migrate the resource.

2. The method as recited in claim 1, wherein the mobile IoT device lacks adequate on-board processing capability to run the application on the mobile IoT device.

3. The method as recited in claim 1, further comprising initially deciding, prior to making the migration decision, to replicate the application to several candidate nodes in parallel.

4. The method as recited in claim 1, wherein the second node is selected to receive the application from the first node based on an expected latency of communications between the second node and the mobile IoT device.

5. The method as recited in claim 1, wherein the portion of the application is migrated automatically from the first node to the second node when the mobile IoT device reaches the predicted location.

6. The method as recited in claim 1, wherein migration of the portion of the application begins prior to the mobile IoT device reaching the predicted location.

7. The method as recited in claim 1, wherein the mobile IoT device is an unmanned vehicle, or an autonomous vehicle.

8. The method as recited in claim 1, wherein the application is accessible to, and usable by, the mobile IoT device at the second node when the mobile IoT device arrives at the expected location.

9. A non-transitory storage medium having stored therein instructions that are executable by one or more hardware processors to perform operations comprising:

receiving input concerning a mobile IoT device, and the input comprises: information about a location of the mobile IoT device; information about a direction and orientation of the mobile IoT device; resources available at a set of nodes; time required to migrate an application; information about whether the mobile IoT device is moving; and, when the mobile IoT device is moving, information about the range, speed, and bearing of the mobile IoT device;

generating a predicted location at a given point in time of the mobile IoT device based on the input received;

using the predicted location at the given point in time of the mobile IoT device, a map of nodes in an environment containing the set of nodes where the mobile IoT device is located, and the input to make a decision as to whether to migrate part or all of an application, used by the mobile IoT device, from a first node at which the application is executable to a second node expected to be accessible by the mobile IoT device when the mobile IoT device reaches the predicted location;

migrating a portion of the application from the first node to the second node, wherein the portion of the application includes differences between a current application state and an instance of the application existing at the second node and the second node and the first node are physically separated by a distance;

in response to obtaining information indicating the predicted location, automatically pre-positioning a resource at the second node, and the resource comprises a resource that is needed to support operation of the application, and wherein pre-positioning the resource comprises replicating a virtual machine, and/or a replicating a container, at the second node; and notifying the mobile IoT device that the resource is in process of being migrated, is expected to be available for use by the mobile IoT device at the second node, and when the resource is expected to be available based on an estimated time required to migrate the resource.

10. The non-transitory storage medium as recited in claim 9, wherein the mobile IoT device lacks adequate on-board processing capability to run the application on the mobile IoT device.

11. The non-transitory storage medium as recited in claim 9, wherein the operations further comprise initially deciding, prior to making the migration decision, to replicate the application to several candidate nodes in parallel.

12. The non-transitory storage medium as recited in claim 9, wherein the second node is selected to receive the application from the first node based on an expected latency of communications between the second node and the mobile IoT device.

13. The non-transitory storage medium as recited in claim 9, wherein the portion of the application is migrated automatically from the first node to the second node when the mobile IoT device reaches the predicted location.

14. The non-transitory storage medium as recited in claim 9, wherein migration of the portion of the application begins prior to the mobile IoT device reaching the predicted location.

15. The non-transitory storage medium as recited in claim 9, wherein the mobile IoT device is an unmanned vehicle, or an autonomous vehicle.

16. The non-transitory storage medium as recited in claim 9, wherein the application is accessible to, and usable by, the mobile IoT device at the node when the mobile IoT device arrives at the expected location.

* * * * *